(12) United States Patent
Habif

(10) Patent No.: US 9,110,158 B2
(45) Date of Patent: Aug. 18, 2015

(54) BIPHOTON RANGING WITH HOM INTERFERENCE

(71) Applicant: RAYTHEON BBN TECHNOLOGIES CORP., Cambridge, MA (US)

(72) Inventor: Jonathan L. Habif, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 14/064,592

(22) Filed: Oct. 28, 2013

(65) Prior Publication Data

US 2015/0077734 A1    Mar. 19, 2015

Related U.S. Application Data

(60) Provisional application No. 61/880,109, filed on Sep. 19, 2013.

(51) Int. Cl.
*G01S 17/10*   (2006.01)
(52) U.S. Cl.
CPC ..................... *G01S 17/107* (2013.01)
(58) Field of Classification Search
CPC ............. G01C 3/08; G01B 9/02; G01S 17/87
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS 7,359,064 B1 *    4/2008    Bahder ..................... 356/496

OTHER PUBLICATIONS

Erkmen, Baris I. et al., "Maximum Likelihood Time-of-Arrival Estimation of Optical Pulses Via Photon-Counting Photodetectors," IEEE, ISIT 2009, Seoul, Korea, Jun. 28-Jul. 3, 2009, pp. 1909-1913.
Hong, C. K. et al., "Measurement of Subpicosecond Time Intervals Between Two Photons by Interference," Physical Review Letters, vol. 59, No. 18, Nov. 2, 1987, pp. 2044-2046.

* cited by examiner

*Primary Examiner* — Luke Ratcliffe
(74) *Attorney, Agent, or Firm* — Christie, Parker & Hale, LLP

(57) ABSTRACT

A method for range finding of a target including: generating a first photon and a second photon identical to the first photon; transmitting the first photon towards the target and delaying the second photon by a time delay; receiving the first photon reflected from the target and the delayed second photon; interacting the reflected first photon and the delayed second photon to produce HOM interference; detecting photo-statistics at an output of the HOM interference; when the two photons are output at the same output port, repeating the above processes; when the reflected first single photon and the delayed second single photon are output at different output ports, changing the time delay and repeating the above processes; repeating the above processes for a number of times to arrive at a final estimate for a value of the time delay corresponding to the final estimate of the target range.

20 Claims, 6 Drawing Sheets

BIPHOTON RANGING WITH HOM INTERFERENCE

CROSS-REFERENCE TO RELATED APPLICATIONS

This Patent Application claims the benefits of U.S. Provisional Patent Application Ser. No. 61/880,109, filed on Sep. 19, 2013 and entitled "Biphoton Ranging With HOM Interference," the entire content of which is hereby expressly incorporated by reference.

STATEMENT REGARDING FEDERALLY SPONSORED RESEARCH

This invention disclosure is related to Government Contract No. HR0011-10-C-0162. The U.S. Government has certain rights to this invention.

FIELD OF THE INVENTION

This invention generally relates to enhanced optical sensing systems, such as ranging systems, and more specifically to biphoton ranging with HOM interface using single photons.

BACKGROUND

Optical ranging has become an important capability for imaging systems, offering 3D reconstruction of standoff targets and enabling tasks such as, target identification, characterization and orientation. Optical ranging may be performed by laser or radar. Typically, laser ranging is performed using a short pulsed laser, and a high-speed photodetector, measuring time of flight of the optical pulse and then calculating the distance to the target, given the speed of optical pulse (light). However, in a photon starved regime, for example in the dark, the minimum error that can be achieved using this technique is large, requiring long acquisition times to achieve reliable estimate of range to target.

Recent work has shown the limited capabilities of laser ranging systems operating in the low-photon limit that employ coherent state sources and direct detection receivers. For example, see, Baris I. Erkmen, and Bruce Moision, "Maximum Likelihood Time-of-Arrival Estimation Of Optical Pulses Via Photon-Counting Photodetectors," IEEE, ISIT 2009, Seoul, Korea, Jun. 28-Jul. 3, 2009 (hereinafter referred to as "[1]"), the entire contents of which are hereby expressly incorporated by reference.

For example, in [1], an analytic model for the mean-square error of a maximum likelihood (ML) estimator was developed. Then, two phenomena that cause deviations from a Cramer-Rao bound at low signal photon flux was illustrated. The model accurately predicts the ML performance over all regimes that we considered. An approximation to the threshold at which the ML estimator fails to provide better than a random guess of the pulse arrival time was also derived.

SUMMARY

Figure 1:
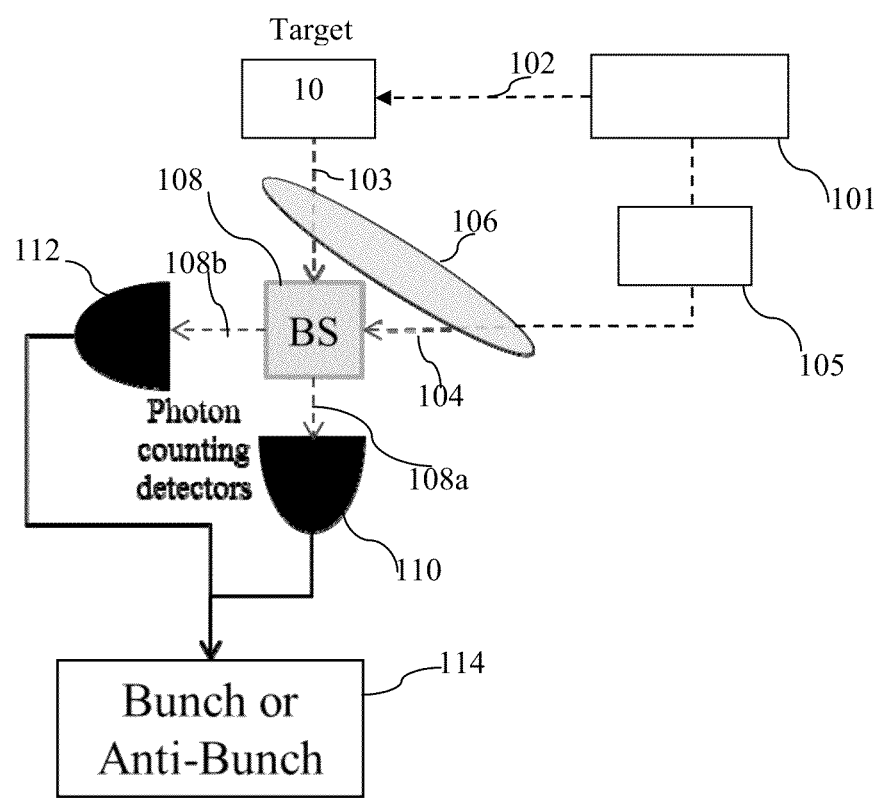
FIG. 1 is an exemplary block diagram of a transmitter/receiver for performing bi-photon ranging with an HOM receiver, according to some embodiments of the present invention.

The present invention is a non-classical alternative to optical ranging, using a non-classical bi-photon source at the transmitter, and using Hong-Ou-Mandel (HOM) quantum interference and photon counting detectors at the receiver to substantially improve the root mean square error RMSE of the range estimate.

In some embodiments, the present invention is a method for range finding of a target. The method includes: a) generating a first single photon; b) transmitting the first single photon towards the target; c) generating a second single photon identical to the first single photon; d) delaying the second single photon by a time delay; e) receiving the transmitted first single photon reflected from the target; f) receiving the delayed second single photon; g) interacting the received reflected first single photon and the delayed second single photon to produce Hong-Ou-Mandel (HOM) interference; h) detecting photo-statistics at an output of the HOM interference; i) when the reflected first single photon and the delayed second single photon are output at the same output port, repeating a) to h); j) when the reflected first single photon and the delayed second single photon are output at different output ports, changing the time delay and repeating a) to h); k) repeating a) to j) for a pre-determined number of times to arrive at a final estimate for a value of the time delay; and l) determining the target range corresponding to the final estimate for the value of the time delay after said predetermined number of times.

In some embodiments, the present invention is a system for range finding of a target. The system includes: a photon generation source for generating a first single photon and a second single photon identical to the first single photon; a transmitter for transmitting the first single photon towards the target; a variable delay for delaying the second single photon by an time delay; a receiver for receiving the transmitted first single photon reflected from the target and the delayed second single photon a beam splitter for interacting the received reflected first single photon and the delayed second single photon to produce Hong-Ou-Mandel (HOM) interference; a photon count detector for counting photons at outputs of the beam splitter. The photon generation, photon transmission, delaying the second photon, receiving the photons and interacting the received photons are repeated for a predetermined number of times when the reflected first single photon and the delayed second single photon are output at the same output port of the beam splitter, wherein the variable delay is configured to change the time delay, when the reflected first single photon and the delayed second single photon are output at different output ports of the beam splitter, and wherein said photon generation, photon transmission, delaying the second photon, receiving the photons and interacting the received photons are then repeated for said predetermined number of times. The system further includes a processor for determining the target range corresponding to value of the time delay after said predetermined number of times.

In some embodiments, the first single photon and the second single photon are generated simultaneously. In other embodiments, the first single photon and the second single photon are generated with a predetermined time interval between them.

In some embodiments, the initial value of the time delay is based on a range of the target times two, for example, in such a way to minimize the mean square error (MSE) of the target range estimate.

DETAILED DESCRIPTION

In some embodiments, the present invention comprises of a transmitter/receiver design that capitalizes on non-classical light and quantum interference to get a reliable estimate of range to target, using fewer photons than needed by the classical ranging system. The invention uses identical single photons (one transmitted to the target and then reflected from the target, and one stored in a variable time delay within the ranging system), and Hong-Ou-Mandel (HOM) interference, as the transmitter and receiver, respectively. This is followed by a direct detection at the receiver. At each detection event, a HOM interference of the two photons results in photon bunching behavior (both output photons are detected in the same output port, if the input photons are identical and arrive at precisely the same time at the input) or anti-bunching behavior (the output photons are detected in different output ports). After each detection event, the target hypothesis (the value of the time delay) and transmitter configuration is updated, based on posteriori detection events.

As the photons become completely distinct in arrival times, the bunching and anti-bunching probabilities $P_B$, $P_{AB} \to \frac{1}{2}$. The probability $P_{AB}(\delta)$ is described in detail, in C. K. Hong, Z. Y, Ou, and L. Mandel, "Measurement of Subpicosecond Time Intervals Between two Photons By Interference," Department of Physics and Astronomy, University of Rochester, Rochester, N.Y., (hereinafter referred to as "[2]"), the entire contents of which are hereby expressly incorporated by reference. In [2], an interference technique was used to measure the time intervals between two photons, and by implication, the length of the photon wave pocket, produced in a process of parametric down-conversion. The width of the time-interval distribution, which was determined by an interface, was found to be about 100 fs, with an accuracy that could in principle be less than 1 fs. It was proved in [2] that when two identical photons impinge on two ports of a beamsplitter simultaneously, they "bunch" upon exiting.

In some embodiments, the root mean square error (RMSE) of the range estimate is calculated as a function of the number of target-return photons captured by the receiver. This ranging technique outperforms the standard protocol of a coherent state transmitter, direct detection of the return and the maximum likelihood estimate processing of the detection events. The advantage afforded by the non-classical configuration of the present invention is particularly pronounced when the dynamic range of the target location becomes equivalent in length-scale to the width of the optical pulse used for interrogation. The advantage gained with this non-classical ranging technique holds even for propagation through lossy channels, making it viable as a practical application for non-classical states. This way, the RMSE of the range estimate is substantially improved.

FIG. 1 is an exemplary block diagram of a transmitter/receiver for performing bi-photon ranging with an HOM receiver, according to some embodiments of the present invention. As shown, a photon source 101 emits identical photon pairs, a signal photon 102 and an idler photon 104. The identical photon pairs may be emitted simultaneously, or a predetermined amount of time apart from each other. The photon source 101 may be a near bi-photon source using a process called spontaneous parametric down conversion (SPDC), or any other known type of photon source. The signal photon 102 is directed toward a target of interest 10, which lies at range r from the photon source 101, and the idler photon 104 is directed into a (photon) delay 105, with adjustable delay time. In some embodiments, the initial delay time of the photon delay 105 is set to coincide with the round trip time required for the signal photon 102 to return from the target's hypothesized range $\hat{r}$.

The signal photon 102 reflected from the target 10 (the target return photon 103) and the idler photon 104 are then directed into two ports of, for example, a 50/50 beamsplitter 108, and the output ports 108a and 108b of the beamsplitter are monitored by photon counting detectors 110 and 112, respectively. A HOM interference of photons 106 at the input ports of the beamsplitter 108 results in photon bunching behavior 114. That is, both output photons are detected in the same output port, if the input photons are identical and arrive at precisely the same time at the input ports of the beamsplitter 108. However, if the photons do not arrive simultaneously at the beamsplitter input, anti-bunching behavior 114 occurs at the output of the beamsplitter 108, that is, the output photons are detected in different output ports. In this case, the amount of the time delay in the variable photon delay 105 is changed (increased or decreased) and the above process is repeated. In some embodiments, the photon counting detectors 110 and 112 are checked to see if either one of them has counted two photons, or if each one has counted one photon, at the output of the beamsplitter.

In some embodiments, the photons are optical photons. In general, optical photons are used in laser radars, however, other types of photons, for example, photons in the RF or other frequency bands are also within the scope of the present invention.

Figure 2:
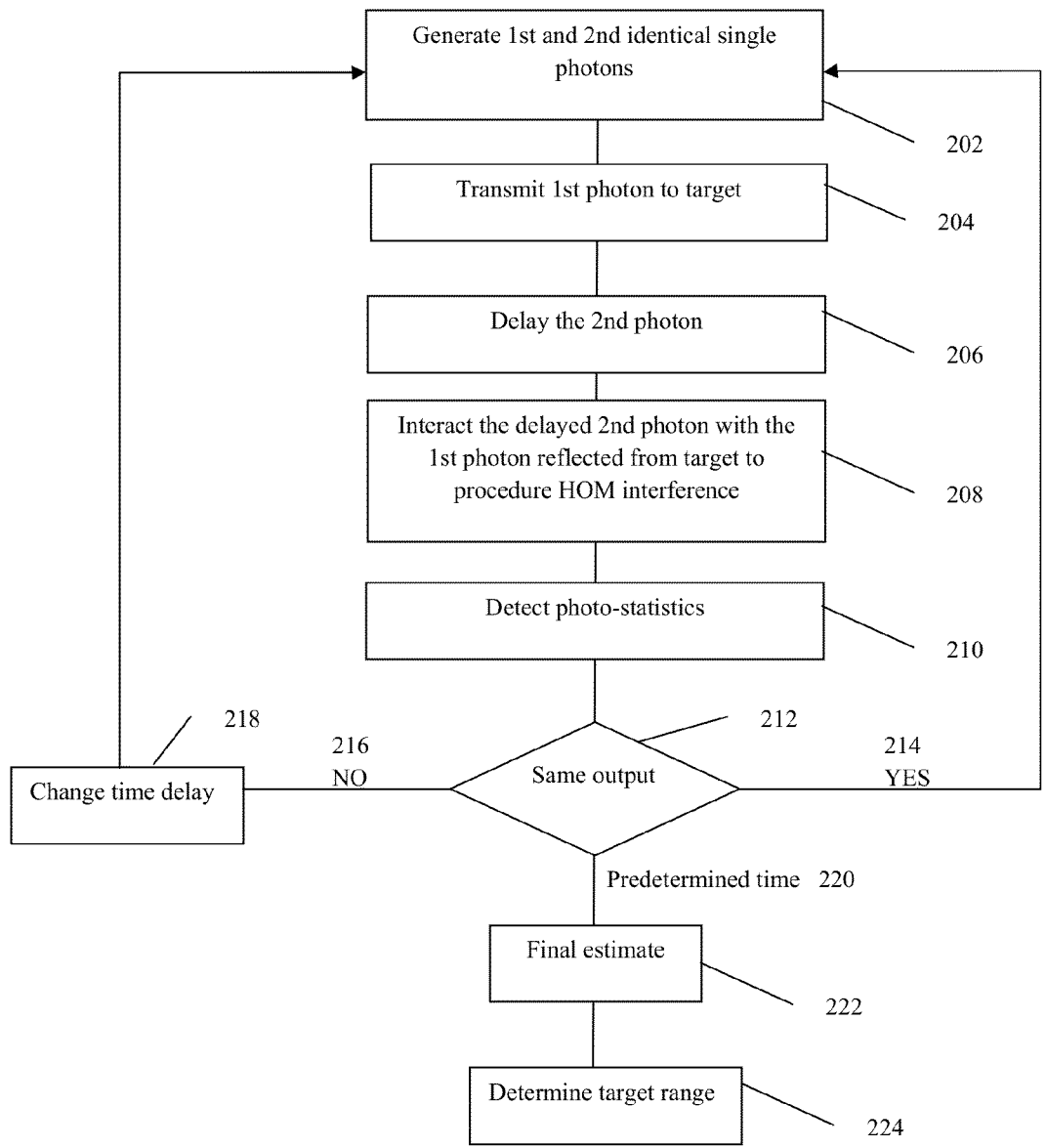
FIG. 2 is an exemplary process flow for performing bi-photon ranging with an HOM receiver, according to some embodiments of the present invention.

FIG. 2 is an exemplary process flow for performing bi-photon ranging with an HOM receiver, according to some embodiments of the present invention. In block 202, a first single photon and a second single photon identical to the first single photon are generated by a photon source. The first single photon is emitted/transmitted towards the target and the second single photon is time-delayed, in blocks 204 and 206, respectively. The first single photon reflected from the target and the delayed second single photon are interacted, for example at a beamsplitter, to produce HOM interferences, that is bunching or anti-bunching behavior, in block 208. Photon statistics (bunching or anti-bunching behavior) is then detected at the output, in block 210.

In block 212, it is determined whether the two output photons are detected in the same output port (bunching behavior) or the two output photons are detected at different output ports (anti-bunching behavior). If the reflected first single photon and the delayed second single photon are output at the same output port (214), the processes in blocks 202 to 212 are repeated. On the other hand, if the reflected first single photon and the delayed second single photon are output at different output ports (216), the value of the time delay is changed in block 218 and then the processes in blocks 202 to 212 are repeated. Blocks 202 to 218 are repeated for a predetermined number of times (220) to arrive at a final estimate of the time delay (222), which would be equal to the travel time of the first single photon to and from the target.

Finally, in block 224, the target range is determined corresponding to the final estimate for the value of the time delay. In some embodiments, the target range is determined by multiplying the final estimate for the value of the time delay (the travel time of the first single photon to and from the target) by speed of light (first single photon) to obtain distance to the target. The initial value of the time delay is based on a range of the target times two.

In some embodiments, the measurement of range to a target in a single spatial mode is considered. The range location of the target r is drawn from a set of initial prior probabilities $P^0(r)$, which are at over the dynamic range of the candidate target locations L. An initial range estimate $\hat{r}^0$ (e.g., the initial value of the time delay) is chosen as the mid-point of $P^0(r)$ achieving RMSE=$L/\sqrt{12}$, that is, the minimum RMSE achievable for flat priors in the absence of any return photons. After each target interrogation, an a posteriori probability distribution P(r/detection) is calculated and the new target range estimate $\hat{r}$ is set as the range value corresponding to the maximum of this probability distribution. Following, a method for updating the a posteriori probability distribution for the bi-photon ranging system is described and the RMSE for the range estimate results is compared against those achieved using coherent states and direct detection following the methods from [1].

After a detection event, an a posteriori probability distribution is calculated for the range to the target using Bayes' Theorem. These updated probability distributions are dependent on whether a bunching or anti-bunching event was detected and are given as, $$P(r/\text{bunch}) = \frac{P(\text{bunch}/r, \hat{r}) \cdot P(r)}{P(\text{bunch})} \quad (1)$$

$$P(r/\text{antibunch}) = \frac{P(\text{antibunch}/r, \hat{r}) \cdot P(r)}{P(\text{antibunch})} \quad (2)$$

where $P(\text{bunch}/r,\hat{r})$ and $P(\text{antibunch}/r,\hat{r})$ are the probabilities of detecting a bunching event and an anti-bunching event, respectively, given target range r and target hypothesis $\hat{r}$ (value of the time delay). The distribution P(r) is the target range probability distribution prior to the detection event; P(bunch) and P(antibunch) are the cumulative probabilities for a bunching and anti-bunching events respectively, and normalize the probability distributions calculated in [1].

After each detection event, a range estimate $\hat{r}$ is made by finding the peak of the a posteriori probability distribution. If a bunching event is detected, the peak of the updated probability distribution is located at the same $\hat{r}$ hypothesized before the target interrogation. As illustrated in FIG. 1, if an anti-bunching event occurs, HOM interference dictates that $\hat{r} \neq r$ and drives the probability distribution at that range value to zero, when calculating the a posteriori probability distribution P(r/antibunch). The updated $\hat{r}$ is chosen from the updated probability distribution, for example, as the peak of the updated probability distribution. Another target interrogation then may occur following the same procedure described here.

Figure 3:
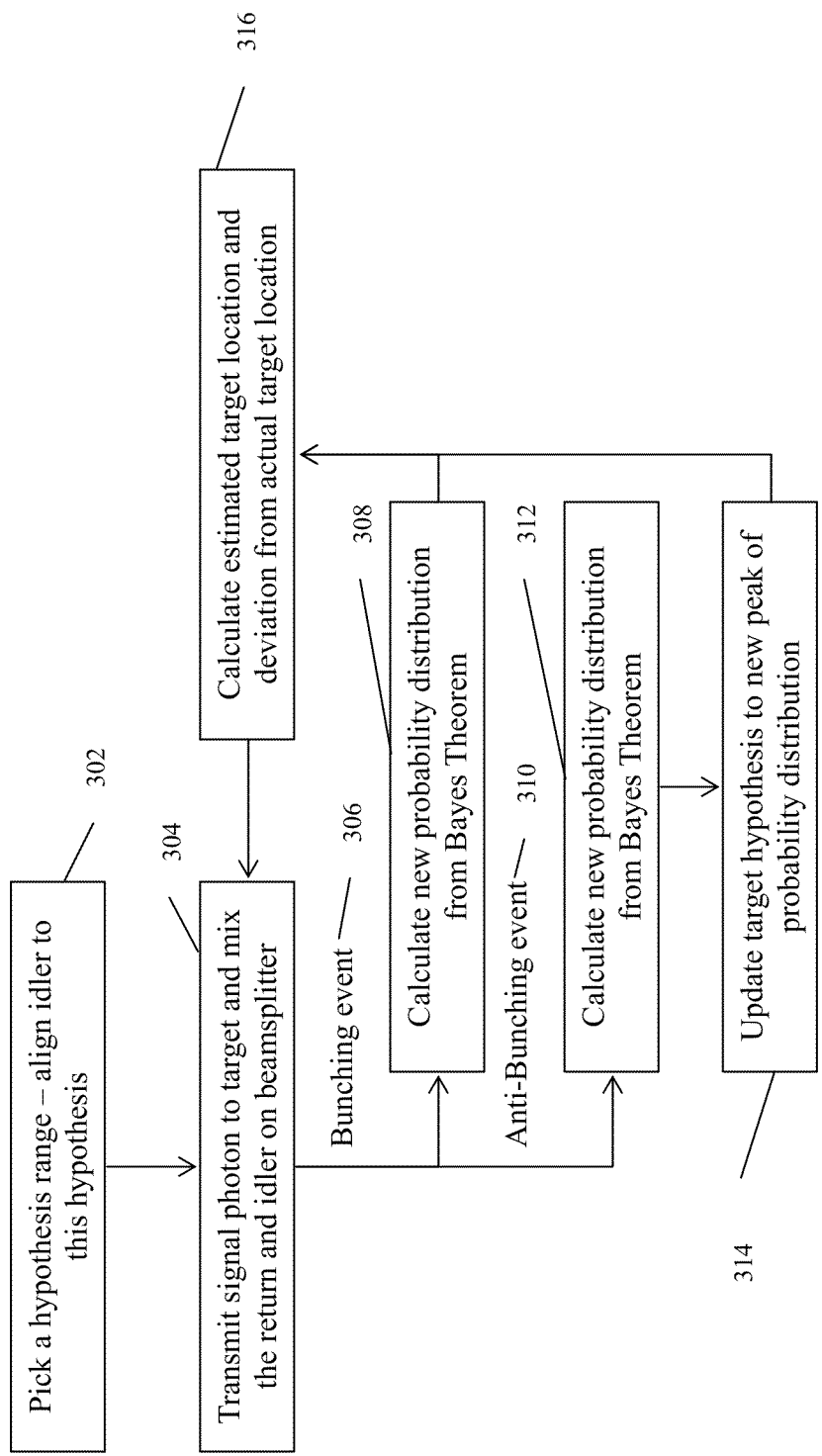
FIG. 3 is an exemplary process flow for performing bi-photon ranging with an HOM receiver, according to some embodiments of the present invention.

FIG. 3 is an exemplary process flow for performing bi-photon ranging with an HOM receiver, according to some embodiments of the present invention. In block 302, an (initial) hypothesis range to the target is selected for the initial value of the time delay, for example, an initial value is selected to minimize the initial mean square error (MSE). Also, the idler (second) photon is aligned to this hypothesis, that is, the initial delay of the idler photon is matched to that of the initial estimate of target range. In block 312, the signal (first) photon is transmitted towards the target and its return (reflected) photon is mixed (interacted), for example, at the input of a beamsplitter to generate HOM interference. If the HOM interference results in a bunching event (306), a new probability distribution is calculated for the estimated range to the target, for example, using Bayes theorem, in block 308. If the HOM interference results in an anti-bunching event (310), the target hypothesis is updated to, for example, a new peak of probability distribution, in block 314. For example, similar to the bunching case, a new probability distribution is calculated and the target hypothesis is updated to the peak of that new probability distribution.

In block 316, an estimated target location and deviation from actual target location is calculated. In some embodiments, the estimated target location is chosen as the peak of the updated probability distribution. This may be accepted as the target estimate, or the target interrogation repeated again (or as many times as the system requires) to achieve a more accurate (lower MSE) target range estimate.

Monte-Carlo type simulations were performed for some embodiments to calculate the RAISE of the estimated range using both the standard coherent state direct-detection ranging method and the bi-Photon ranging method. Both simulations began by assigning a prior probability distribution $P^0(r)=c \cdot \Pi(r/L)$ where c is a constant of normalization, and $\Pi(r/L)$ is the rectangular function with width L setting the dynamic range of the candidate target locations. For each Monte-Carlo run, a target location is randomly chosen from the distribution $P^0(r)$. After each target interrogation an a posteriori probability distribution is calculated from the maximum likelihood cost function given in (Erkmen et al.) for the coherent state system, or from expressions 1 and 2 in the case of the Bi-photon ranging system. After each interrogation, a target range estimate $\hat{r}$ is taken as the maximum of the a posteriori probability and the error in the estimate $\delta=|\hat{r}-r|$. The root mean square error may be calculated as:

$$RMSE(k) = \sqrt{\frac{1}{N}\sum_{i=1}^{N}(\delta(k))_i^2} \quad (3)$$

where N is the number of Monte-Carlo runs in the simulation, and k is the number of target interrogations used to generate the range estimate $\hat{r}$. For a lossless channel between target and transceiver, $n_r=k$ is the number of received photons from the target return. For a channel with transmissivity $\eta$ the mean number of returned photons $\bar{n}_r=\eta k$. The optical pulses considered in this simulation are Gaussian, taking the normalized functional form $$f(x_0) = \frac{1}{\sqrt{2\pi\sigma^2}}\exp\left(\frac{(x-x_0)^2}{2\sigma^2}\right). \quad (4)$$

The standard deviation $\sigma$ sets the width of the pulse.

For the bi-photon ranging simulations we begin by choosing an initial hypothesis target location $\hat{r}^0$. Setting this value to the mid-point of $P^0(r)$ achieves RMSE=$L/\sqrt{12}$, the minimum RMSE achievable in the absence of any return photons. Next, we calculate the overlap integral in time between the signal and idler pulses as they arrive at the beamsplitter, $$\Phi(\delta) = \int_{-\infty}^{\infty} \psi_s(t-r/c)\psi_i(t-\hat{r}/c)dt \quad (5)$$

where $\psi_s(t)$ and $\psi_i(t)$ are the normalized wavefunctions for the signal and idler photons, respectively, and c is the speed of light. The quantity $\Phi$ can then be used to calculate the probability for a bunching event to occur, given target range r and current target hypothesis $\hat{r}$.

After recording a detection event, the probability distribution is updated according to the expressions in equations (1) and (2), and the range value corresponding to the maximum of this a posteriori probability function is selected as the new range estimate $\hat{r}$. This procedure is repeated for k interrogations and the RMSE calculated from equation (3), after each interrogation.

The coherent state simulations also begin by choosing $\hat{r}^0$ as the mid-point of $P^0(r)$. Choosing a random target location from the distribution $P^0(r)$, a transmitted mean photon number $\bar{n}_T$, for the case of $\eta=1$, $\bar{n}_T = \bar{n}_R$.

A number of photon clicks is randomly chosen from the Poisson distribution, and time of arrival for those clicks from the Gaussian distribution centered at range r with width a corresponding to the width of the optical pulse. If n is the number of photon detects for a target interrogation, following the procedure in [1], the cost function R is calculated as:

$$R = (P^0(r)) \cdot \Sigma_{i=0}^{n-1} f(r_i) \text{ for } n \geq 1. \quad (6)$$

The range estimate $\hat{r}$ is then calculated as the range value corresponding to max(R). In the event n=0, the range estimate is $\hat{r}=\hat{r}^0$.

Figure 4:
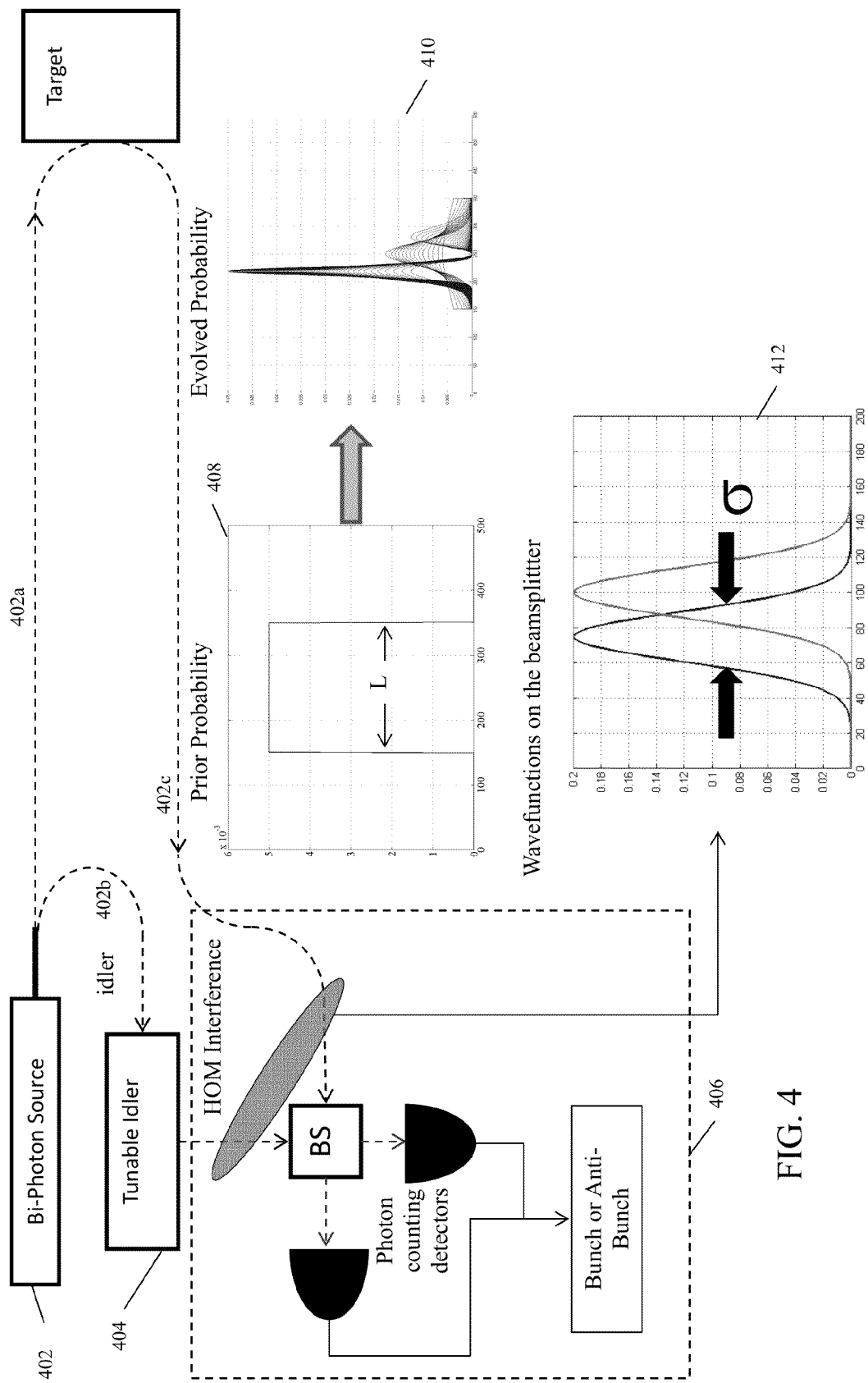
FIG. 4 is an exemplary block diagram of a transmitter and HOM receiver for performing bi-photon ranging including wave functions and probability distributions, according to some embodiments of the present invention.

FIG. 4 is an exemplary block diagram of a transmitter and HOM receiver for performing bi-photon ranging including wave functions and probability distributions, according to some embodiments of the present invention. A shown, a Bi-photon source generates a single signal photon 402a and a single idler photon 402b. The signal photon 402a is emitted towards the target and returned as the returned photon 402c. The idler photon is delayed, for example, by tunable delay 404 and input to the HOM receiver 406 along with the returned photon 402c. The bunching or anti-bunching behavior is detected at the output of the HOM receiver 406. The exemplary wavefunctions for the two photons, shown in block 412, are the quantum probability distributions for the signal and idler photons. These wavefunctions interfere with each other during the process of HOM interference. The probability distribution in block 408 shows the prior probability distribution for the unknown range of the "target". After each execution of the process shown in FIG. 2, this probability distribution is updated. Each update generates a new peak of the distribution, illustrated in block 410. For more target interrogations, the target estimate becomes closer to that of the actual target range.

Figure 5:
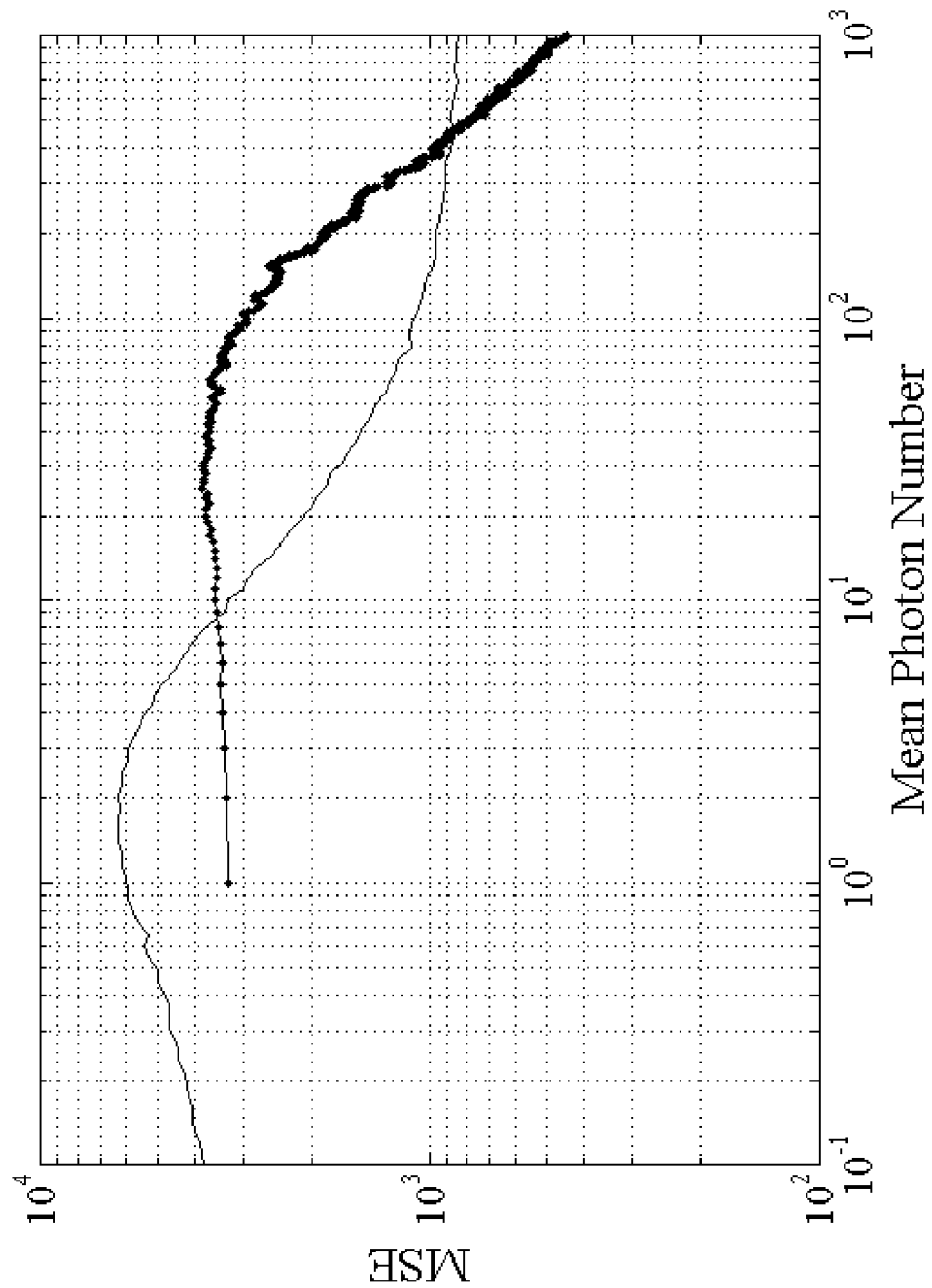
FIG. 5 is an exemplary plot comparing the performance of the classical approach and the performance of the present invention.

FIG. 5 is an exemplary plot comparing the performance of the classical approach (coherent state of a laser range finder) and the performance of the present invention. FIG. 5 illustrates the advantages from HOM ranging approach compared to the conventional (coherent state) approaches. The thin solid line is the MSE achieved by classical laser ranging when the optical pulse width~L. For this example, the dotted line shows that the HOM ranging technique achieves a lower MSE when the mean photon number is increased pas 500 photons. That is, this shows that BiPhoton Ranging technique outperforms coherent state/direct detection ranging. Performance improvement is most pronounced with s≥the dynamic range of the target location. This is a quantum sensor the performance improvement of which is still present even with in loss.

Figure 6:
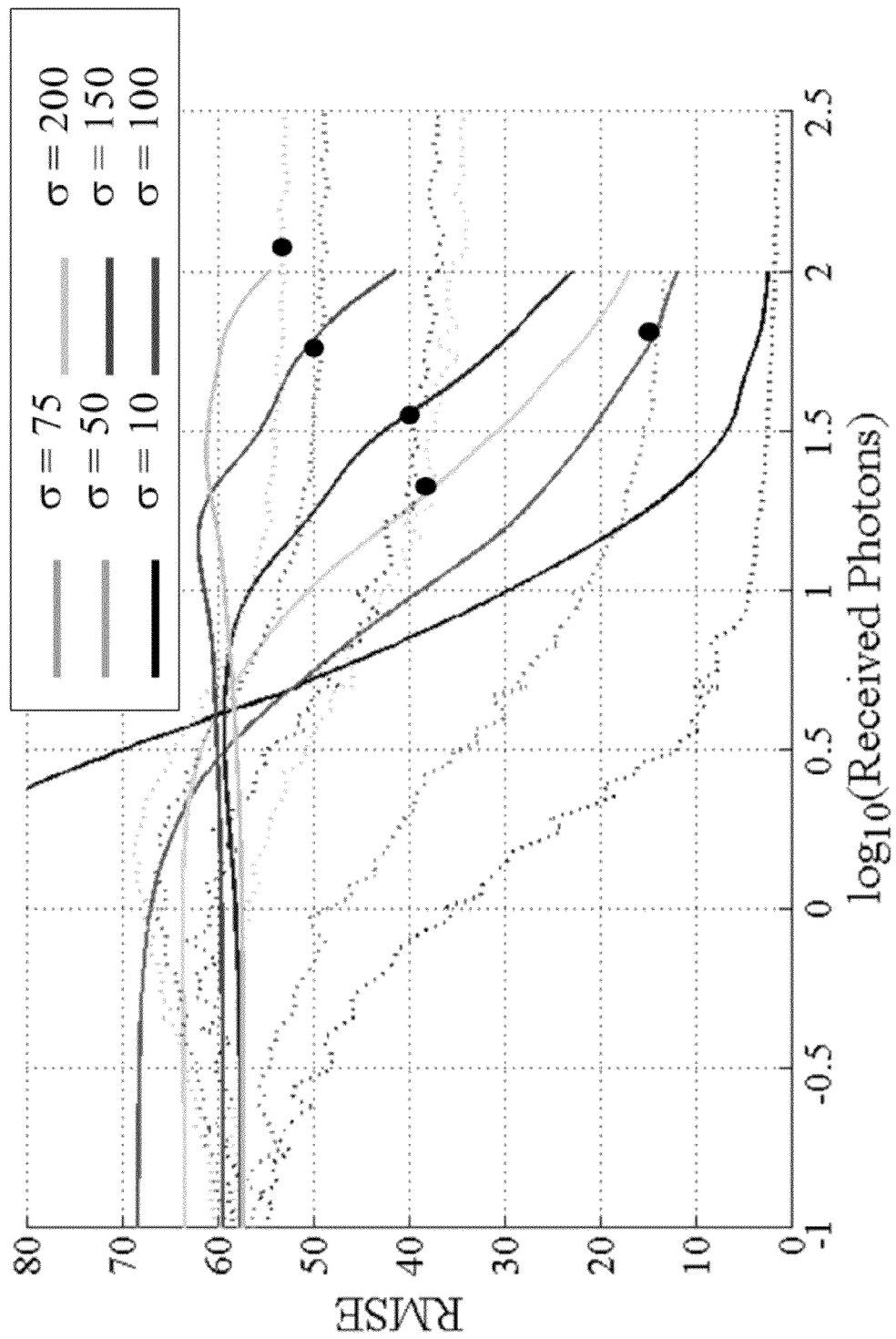
FIG. 6 is a graphical representation of RMSE range estimates for dynamic range L=200 and $\sigma$=10, 50, 75, 100, 150, 200, according to some embodiments of the present invention.

FIG. 6 is a graphical representation of RMSE range estimates for dynamic range L=200 and σ=10, 50, 75, 100, 150, 200, according to some embodiments of the present invention. Over k Monte-Carlo runs, the RMSE from was calculated from equation (3). The results from the Monte-Carlo simulations are shown in FIG. 2, where RMSE for range estimates for coherent state and bi-photon state ranging configurations are plotted as a function of $n_R$ and $\bar{n}_R$. The simulations were conducted using a dynamic range for the target of L=200, and varying the interrogating pulse width σ.

The coherent state results are qualitatively similar to those from [1]. The results in FIG. 6 are for η=1 and the point at which bi-photon ranging outperforms the coherent state estimate for equivalent σ is marked with a '•'. As shown, as σ is increased, the slope at which the RMSE improves for the coherent state system improves diminishes, as described in [1]. The biphoton ranging system of the present invention delivers the largest advantage when the width of the optical pulses is on the order of the dynamic range covered by the ranging system.

In some embodiment, a hybrid (combination) of the bi-photon technique and the classical (coherent state) may be used for different ranges of the target. For example, as shown in FIG. 5, in different regimes of "Mean Photon Number," different ranging systems are optimum. For example, as shown, between 1-10 photons the HOM ranging system is optimum. Similarly, between 10-500 photons the classical ranging system is optimum, and beyond 500 photons the HOM ranging system is once again optimum.

In some embodiments, the present invention is a "hybrid" system that switches back and forth between the two ranging approaches depending on which one produces the lowest MSE. That is, the hybrid system performs its incremental ranging using both approaches, then it looks at the lowest MSE of the two approaches and picks the one with smaller MSE. The process is then repeated as explained above.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method for range finding of a target comprising:
    a) generating a first single photon;
    b) transmitting the first single photon towards the target;
    c) generating a second single photon identical to the first single photon;
    d) delaying the second single photon by a time delay;
    e) receiving the transmitted first single photon reflected from the target;
    f) receiving the delayed second single photon;
    g) interacting the received reflected first single photon and the delayed second single photon to produce Hong-Ou-Mandel (HOM) interference;
    h) detecting photo-statistics at an output of the HOM interference;
    i) when the reflected first single photon and the delayed second single photon are output at the same output port, repeating a) to h);
    j) when the reflected first single photon and the delayed second single photon are output at different output ports, changing the time delay and repeating a) to h);

k) repeating a) to j) for a pre-determined number of times to arrive at a final estimate for a value of the time delay; and l) determining the target range corresponding to the final estimate for the value of the time delay after said predetermined number of times, wherein an initial value of the time delay is selected in such a way to minimize the mean square error (MSE) of the target range estimate and wherein an initial value of the time delay is selected as a peak of an updated probability distribution.

2. The method of claim 1, wherein the first single photon and the second single photon are generated simultaneously.

3. The method of claim 1, wherein an initial value of the time delay is based on a range of the target times two.

4. The method of claim 1, wherein said predetermined number of times is selected in such a way to achieve a desired mean square error (MSE) of the target range estimate.

5. The method of claim 1, wherein determining the target range further comprises multiplying said final estimate for the value of the time delay by speed of light to obtain distance to the target.

6. A method for range finding of a target comprising:
a) generating a first single photon;
b) transmitting the first single photon towards the target;
c) generating a second single photon identical to the first single photon;
d) delaying the second single photon by a time delay;
e) receiving the transmitted first single photon reflected from the target;
f) receiving the delayed second single photon;
g) interacting the received reflected first single photon and the delayed second single photon to produce Hong-Ou-Mandel (HOM) interference;
h) detecting photo-statistics at an output of the HOM interference;
i) when the reflected first single photon and the delayed second single photon are output at the same output port, repeating a) to h);
j) when the reflected first single photon and the delayed second single photon are output at different output ports, changing the time delay and repeating a) to h);
k) repeating a) to j) for a pre-determined number of times to arrive at a final estimate for a value of the time delay;
l) determining the target range corresponding to the final estimate for the value of the time delay after said predetermined number of times; and
m) using Bayes theorem of conditional probabilities to calculate updated probability distributions for the range to target conditioned on the measurement of a bunching or anti-bunching event.

7. The method of claim 6, wherein an initial value of the time delay is selected in such a way to minimize the mean square error (MSE) of the target range estimate.

8. The method of claim 7, wherein an initial value of the time delay is selected as a peak of an updated probability distribution.

9. A method for range finding of a target comprising:
a) generating a first single photon;
b) transmitting the first single photon towards the target;
c) generating a second single photon identical to the first single photon;
d) delaying the second single photon by a time delay;
e) receiving the transmitted first single photon reflected from the target;
f) receiving the delayed second single photon;
g) interacting the received reflected first single photon and the delayed second single photon to produce Hong-Ou-Mandel (HOM) interference;
h) detecting photo-statistics at an output of the HOM interference;
i) when the reflected first single photon and the delayed second single photon are output at the same output port, repeating a) to h);
j) when the reflected first single photon and the delayed second single photon are output at different output ports, changing the time delay and repeating a) to h);
k) repeating a) to j) for a pre-determined number of times to arrive at a final estimate for a value of the time delay;
l) determining the target range corresponding to the final estimate for the value of the time delay after said predetermined number of times; and
m) updating the time delay of the idler photon to match a peak of a newly updated probability distributions.

10. The method of claim 9, further comprising using Bayes theorem of conditional probabilities to calculate updated probability distributions for the range to target conditioned on the measurement of a bunching or anti-bunching event.

11. A system for range finding of a target comprising:
a photon generation source for generating a first single photon and a second single photon identical to the first single photon;
a transmitter for transmitting the first single photon towards the target;
a variable delay for delaying the second single photon by an time delay;
a receiver for receiving the transmitted first single photon reflected from the target and the delayed second single photon
a beam splitter for interacting the received reflected first single photon and the delayed second single photon to produce Hong-Ou-Mandel (HOM) interference;
a photon count detector for counting photons at outputs of the beam splitter, wherein said photon generation, photon transmission, delaying the second photon, receiving the photons and interacting the received photons are repeated for a predetermined number of times when the reflected first single photon and the delayed second single photon are output at the same output port of the beam splitter, wherein the variable delay is configured to change the time delay, when the reflected first single photon and the delayed second single photon are output at different output ports of the beam splitter, and wherein said photon generation, photon transmission, delaying the second photon, receiving the photons and interacting the received photons are then repeated for said predetermined number of times; and
a processor for determining the target range corresponding to value of the time delay after said predetermined number of times, wherein an initial value of the time delay is selected in such a way to minimize the mean square error (MSE) of the target range estimate and wherein an initial value of the time delay is selected as a peak of an updated probability distribution.

12. The system of claim 11, wherein the first single photon and the second single photon are generated simultaneously.

13. The system of claim 11, wherein an initial value of the time delay is selected in such a way to minimize the mean square error (MSE) of the target range estimate.

14. The system of claim 13, wherein an initial value of the time delay is selected as a peak of an updated probability distribution.

15. The system of claim 11, wherein said predetermined number of times is selected in such a way to achieve a desired mean square error (MSE) of the target range estimate.

16. The system of claim 11, wherein determining the target range further comprises multiplying said final estimate for the value of the time delay by speed of light to obtain distance to the target.

17. A system for range finding of a target comprising:
- a photon generation source for generating a first single photon and a second single photon identical to the first single photon;
- a transmitter for transmitting the first single photon towards the target;
- a variable delay for delaying the second single photon by an time delay;
- a receiver for receiving the transmitted first single photon reflected from the target and the delayed second single photon
- a beam splitter for interacting the received reflected first single photon and the delayed second single photon to produce Hong-Ou-Mandel (HOM) interference;
- a photon count detector for counting photons at outputs of the beam splitter, wherein said photon generation, photon transmission, delaying the second photon, receiving the photons and interacting the received photons are repeated for a predetermined number of times when the reflected first single photon and the delayed second single photon are output at the same output port of the beam splitter, wherein the variable delay is configured to change the time delay, when the reflected first single photon and the delayed second single photon are output at different output ports of the beam splitter, and wherein said photon generation, photon transmission, delaying the second photon, receiving the photons and interacting the received photons are then repeated for said predetermined number of times; and
- a processor for determining the target range corresponding to value of the time delay after said predetermined number of times, wherein the processor is configured to use Bayes theorem of conditional probabilities to calculate updated probability distributions for the range to target conditioned on the measurement of a bunching or antibunching event.

18. The system of claim 17, wherein an initial value of the time delay is based on a range of the target times two.

19. The system of claim 17, wherein the processor is configured to update the time delay of the idler photon to match a peak of a newly updated probability distributions.

20. A system for range finding of a target comprising:
- a photon generation source for generating a first single photon and a second single photon identical to the first single photon;
- a transmitter for transmitting the first single photon towards the target;
- a variable delay for delaying the second single photon by an time delay;
- a receiver for receiving the transmitted first single photon reflected from the target and the delayed second single photon
- a beam splitter for interacting the received reflected first single photon and the delayed second single photon to produce Hong-Ou-Mandel (HOM) interference;
- a photon count detector for counting photons at outputs of the beam splitter, wherein said photon generation, photon transmission, delaying the second photon, receiving the photons and interacting the received photons are repeated for a predetermined number of times when the reflected first single photon and the delayed second single photon are output at the same output port of the beam splitter, wherein the variable delay is configured to change the time delay, when the reflected first single photon and the delayed second single photon are output at different output ports of the beam splitter, and wherein said photon generation, photon transmission, delaying the second photon, receiving the photons and interacting the received photons are then repeated for said predetermined number of times; and
- a processor for determining the target range corresponding to value of the time delay after said predetermined number of times, wherein the processor is configured to update the time delay of the idler photon to match a peak of a newly updated probability distributions.

* * * * *